(No Model.)
H. A. PENNOCK.
TROTTING SULKY.
No. 529,185.  Patented Nov. 13, 1894.
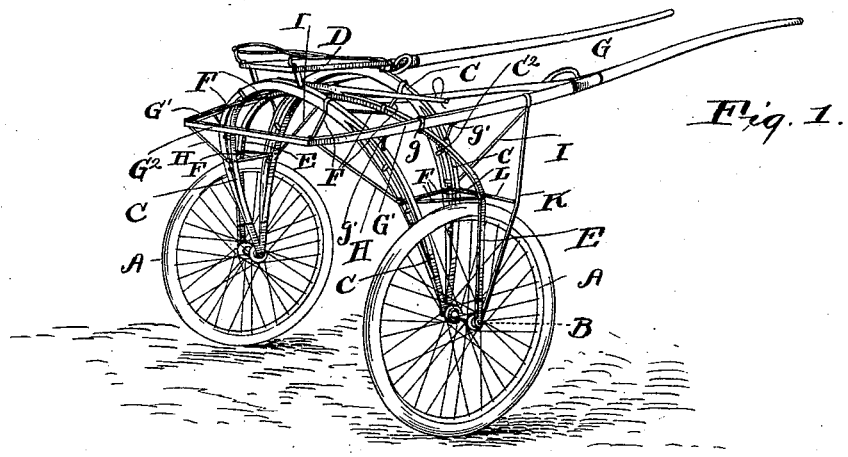
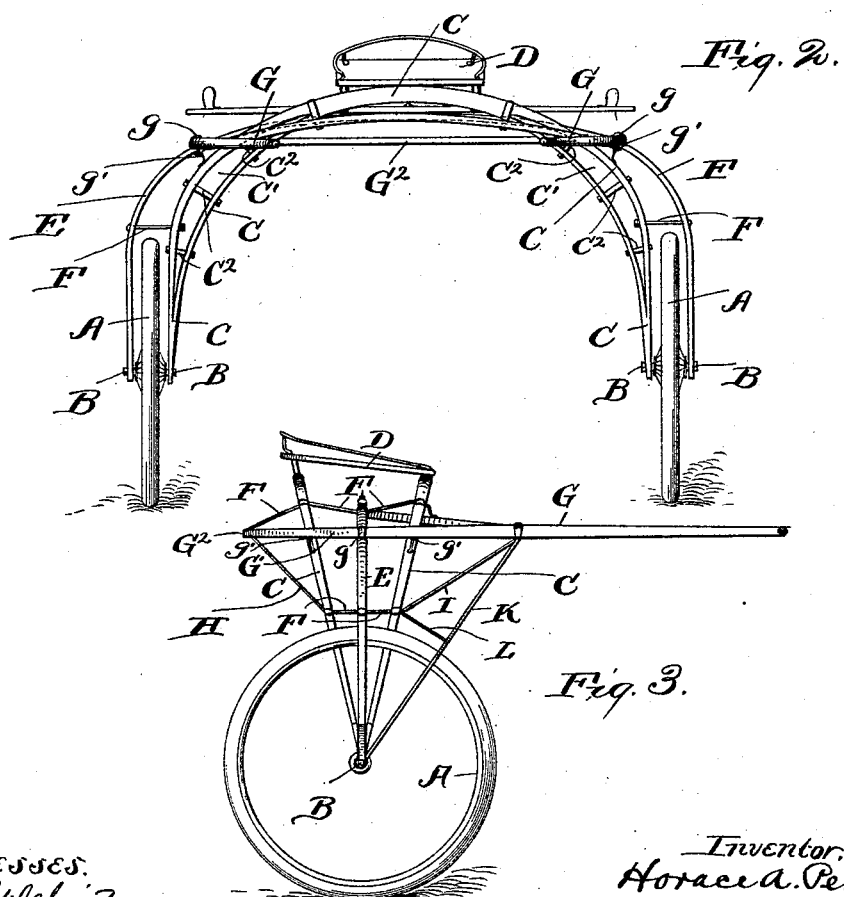

UNITED STATES PATENT OFFICE.

HORACE A. PENNOCK, OF MINERVA, OHIO.

TROTTING-SULKY.

SPECIFICATION forming part of Letters Patent No. 529,185, dated November 13, 1894.

Application filed April 9, 1894. Serial No. 506,877. (No model.)

*To all whom it may concern:*

Be it known that I, HORACE A. PENNOCK, of Minerva, in the county of Stark and State of Ohio, have invented certain new and useful Improvements in Trotting-Sulkies; and I do hereby declare the following to be a full, clear, and exact description of the invention, such as will enable others skilled in the art to which it pertains to make and use the same.

My invention relates to improvements in trotting-sulkies, the object being to construct a light and strong vehicle of the character indicated at a minimum cost.

With this object in view, my invention consists in certain features of construction and in combinations of parts hereinafter described and pointed out in the claims.

In the accompanying drawings, Figure 1 is a view in perspective of a trotting-sulky embodying my invention. Fig. 2 is a front side elevation of the same, and Fig. 3 is a left hand side elevation.

Referring to the drawings, A A designate the wheels of my improved sulky. Said wheels are located a suitable distance apart and each wheel is mounted upon a horizontally arranged stub-axle B. The inner ends of the two axles are connected by means of two arch-shaped frames C C. Said frames diverge from their connection with the axles as shown in Figs. 1 and 2, and the seat D of the vehicle is suitably mounted upon or supported from the central portion of said frames. To render frames C C exceedingly strong, they are trussed between the central portion and ends of the same, as at C'. Trusses C' are preferably formed by splitting the frames at the trussed portions and spreading the split portions apart by means of bolts, rods or suitable members, as shown at $C^2$. An arch-shaped frame E, that is connected with the outer ends of the two axles, is also employed, said frame being located preferably centrally between frames C C and leading upwardly from its connection with the axles and in under the seat of the vehicle as shown. The three arch-shaped frames C, C and E are suitably tied together and braced apart, as at F.

G G designate the shafts of the vehicle. Said shafts are shown extending rearwardly of the seat of the vehicle, as at G', and are connected with each other at their rear extremities by a cross-bar $G^2$ rearward of the rear arch-shaped frame C. The shafts are suitably secured to the central arch-shaped frame E, as at g, and extend preferably over the trussed portions of arch-shaped frames C C and are preferably secured to said frames C C at points next adjacent to said frames, as at g'. The rear ends of the shafts are preferably tied to the trussed portions of the rearward arch-shaped frame C by means of rods H. The shafts, at a point somewhat forward of the forward frame C, are preferably tied to said frame by means of rods I. The shafts are also preferably connected with the outer ends of the axles by means of rods K, and the latter are suitably tied to the forward frame C by means of rods L.

A vehicle constructed as hereinbefore described, it will be observed, is not only light, but is exceedingly strong and durable.

What I claim is—

1. A trotting-sulky having its wheels mounted upon stub-axles, its seat supported by arch-shaped frames connected with the inner ends of the axles, its shafts secured to said frames, suitable means supporting the outer ends of the axles, the aforesaid frames trussed between the ends and central portion of the same by splitting the trussed portions of the frames and spreading apart the split portions and suitably securing the latter in their spread condition, substantially as set forth.

2. A trotting-sulky having its wheels mounted upon stub-axles, its seat supported by arch-shaped frames connected with the inner ends of the axles, its shafts secured to said frames and also to another arch-shaped frame that is connected with the outer ends of the axle, and all of said frames tied together and braced apart, substantially as set forth.

3. A trotting-sulky having its wheels mounted upon stub-axles, its seat supported by arch-shaped frames connected with the inner ends of said axles, its shafts secured to said frames and also secured to another arch-shaped frame that is connected with the outer ends of the axles, the shafts suitably connected with each other at the rear of the vehicle-seat and connected with the outer ends of the axles, and all of the aforesaid frames suitably tied together and braced apart, substantially as set forth.

In testimony whereof I sign this specification, in the presence of two witnesses, this 28th day of February, 1894.

HORACE A. PENNOCK.

Witnesses:
C. H. DORER,
WARD HOOVER.